2 Sheets--Sheet 1.

A. C. MARTIN & R. FERGUSON.
Corn-Planters.

No. 145,115.  Patented Dec. 2, 1873.

Witnesses.

Abdiel C. Martin
Robert Ferguson
Inventors.

by Dyer, Beadle & Co.
Att'ys.

2 Sheets--Sheet 2.
A. C. MARTIN & R. FERGUSON.
Corn-Planters.
No. 145,115.  Patented Dec. 2, 1873.
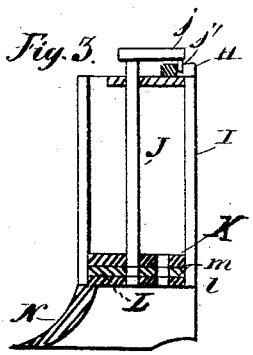
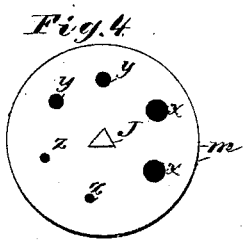
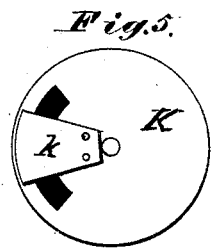
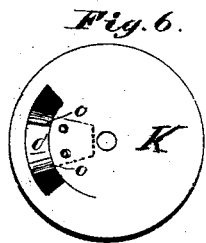
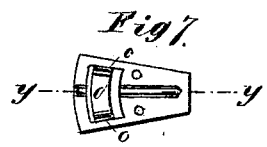
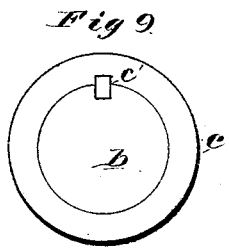
Witnesses
H. C. Clark
B. W. Dyer
Abdiel C. Martin
Robert Ferguson
Inventors,
by Dyer, Beadle
Atty.

UNITED STATES PATENT OFFICE.

ABDIEL C. MARTIN AND ROBERT FERGUSON, OF LENA, ILLINOIS.

IMPROVEMENT IN CORN-PLANTERS.

Specification forming part of Letters Patent No. 145,115, dated December 2 1873; application filed August 22, 1873.

*To all whom it may concern:*

Be it known that we, ABDIEL C. MARTIN and ROBERT FERGUSON, of Lena, in the county of Stephenson and State of Illinois, have invented new and useful Improvements in Corn-Planters; and we do hereby declare that the following is a full and exact description of the same, reference being had to the accompanying drawings and to the letters of reference marked thereon.

This invention is designed for planting corn in certain definite quantities at regular distances apart; and consists mainly, first, in the combination of the actuating mechanism, consisting essentially of a cam-wheel, rock-shaft, and oscillating bar with the seed-dropping mechanism, consisting essentially of a rock-shaft and certain plates or disks; second, in the combination of the actuating mechanism with the hill-indicating mechanism; third, in the combination of the various parts whereby the planting mechanism is thrown in and out of gear. It further consists in certain details of construction, which, in connection with the foregoing, will be fully described hereinafter.

Figure 1:
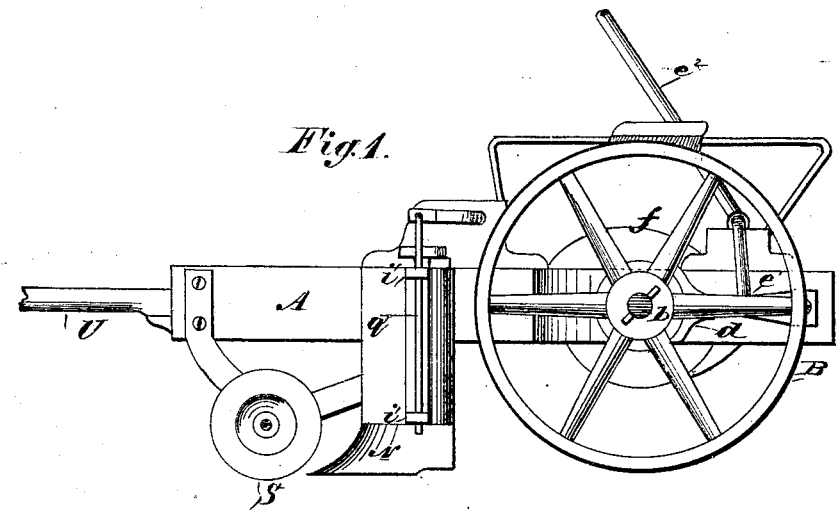
Figure 2:
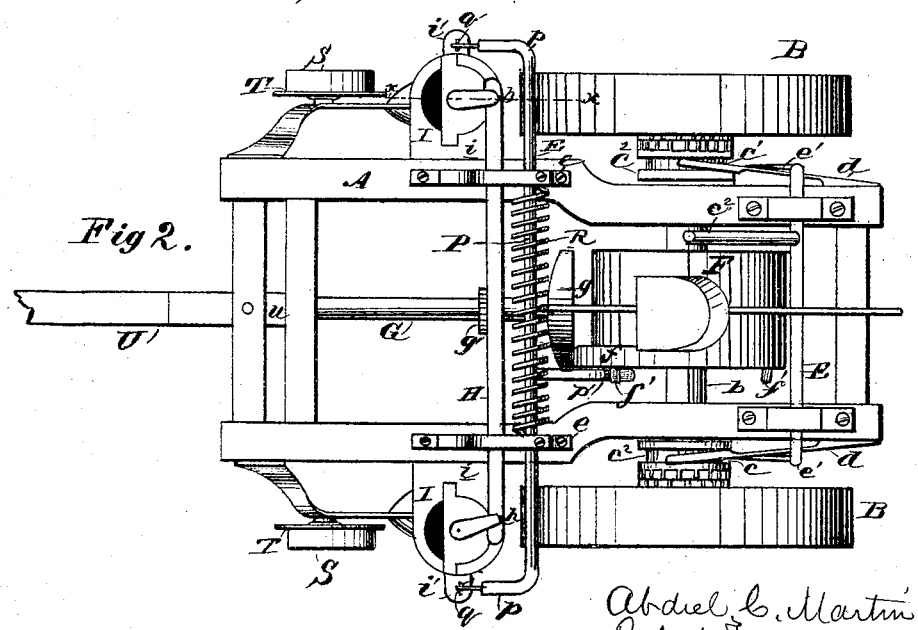

In the drawings, Figure 1 is a side elevation of our invention; Fig. 2, a plan view of the same; Fig. 3, a side view of cylinder on line $x\ x$ of Fig. 2; Fig. 4, a plan view of the intermediate plate; Fig. 5, a plan view of the top plate; Fig. 6, a bottom view of the same; Fig. 7, a similar view of the cap; and Fig. 8, a sectional view on line $y\ y$ of Fig. 7; Fig. 9, a side view of clutch-sleeve and key.

Like letters denote similar parts in each figure.

To enable others skilled in the art to make and use our invention, we will now proceed to fully describe its construction.

A A represent the frame-work of the machine, which may be constructed of any proper material and size. $b$ represents the axle, loosely held in bearings in the frame-work, the ends of which are supported by the main wheels B B, as shown. $c\ c$ represent clutch-sleeves located upon the axle next to the wheels, the outer faces of which are provided with cogs, adapted to engage with corresponding cogs upon the hubs of the wheels B B. These sleeves are secured to the axle by keys $c^1\ c^1$, which permit them to move freely in a lateral direction, but compel them to turn with the axle when it revolves. $d$ represents a spring of suitable material rigidly attached to one end of the frame-work, as shown, and provided at the other with a fork, the arms of which rest in the groove $c^2$ of the sleeve. By means of this spring the sleeve $c$ is pressed, ordinarily, closely into contact with the hub of wheel B, so that the cogs of each intermesh, and the revolution of the wheel is communicated to the sleeve, and through it to the axle. E represents a rock-shaft suitably held in bearings $e$, and provided at each end with the bent arms $e^1\ e^1$, and also with the lever-arms $e^2$. This shaft is so arranged relatively to the springs $c\ c$ that the arms $e^1\ e^1$, when the lever-arm is raised, are brought by the partial revolution of the shaft E into contact with the springs $c\ c$, and, pressing upon their inclined faces, draw them and also the sleeves toward the frame-work, by which means the cogs of the sleeves and the wheels are disconnected, and the revolution of the latter is not communicated to the axle. F represents a wheel, of any proper construction and size, which is rigidly attached to the axle near its center, and is provided upon its periphery, upon opposite ends and upon opposite sides, with cam projections $f\ f$, which, in appearance, resemble curved wedges, the front ends of which are cut away upon one side upon a line inclined at about an angle of forty-five degrees. $f'\ f'$ represent pins projecting from one end of the wheel upon opposite sides of the axle. G represents a rock-shaft supported in proper bearings in the frame, the rear end of which is provided with a double lever, $g$, centrally attached to the shaft, the upper faces of which are downwardly inclined, as shown. $g'$ represents a casting rigidly attached to the shaft G, the upper surface of which is curved and provided with teeth, as shown. H represents a transverse bar supported in bearings in the frame-work, and adapted to move freely therein, which is provided near its center, upon its lower surface, with teeth adapted to engage with the teeth of casting $g'$, and also near each end with a slot, $h$, as shown. I represents a corn-receptacle or seed-hopper of proper material and size. It is generally cylindrical in form, but has an extension, $i$, by means of which it is attached to the frame-work, and also arms or guides $i'$ $i'$, having openings to receive and support the indicating-rod $o$. J represents a rock-shaft, which is centrally held in a vertical position in the cylinder I, its lower end being supported in the bottom plate of the cylinder and its upper end in the covering-plate, as shown. The shaft receives its reciprocating motion from the oscillating bar H, through the mediums of the arm $j$ and pin $j'$, which latter rests in the slot of bar H, as shown. The corn-cylinder is also preferably provided with a hinged door, to cover and protect the seed from exposure. The mechanism which operates to measure and drop the seed will now be described.

K represents an upper plate, which is rigidly attached in any proper manner to the sides of the cylinder, and is provided with a central opening for the passage of the shaft J. It has, moreover, upon the rear side of its center a curved slot, which is partially covered by the centrally-located cap $k$, which covers and holds in place the mechanism for cutting off the supply of seed or corn to the measuring or discharging bucket or chamber, as will be described hereinafter. L represents the bottom plate, rigidly secured to the lower end of the cylinder, and provided with a central bearing for the rock-shaft J, and a discharge-opening, $l$, in rear of its center, as shown. $m$ represents an intermediate disk or plate, attached to the shaft J in such a manner as to move with it, which is provided with a suitable number of openings of various sizes, arranged in pairs, as shown at $x$ $x$, $y$ $y$, $z$ $z$, which openings serve as buckets or chambers for receiving and measuring the seed. This disk is not rigidly secured to the shaft, but is provided with an angular opening which corresponds in form with the outline of the shaft, so that it is made capable of adjustment upon it in such a manner as to bring either pair of holes into action according as it is desired to plant a greater or less quantity of corn.

This adjustment is readily accomplished, as follows: The shaft J is raised until its angular portion is detached from the disk, when it may be turned so that its rear portion will coincide with the holes which it is desired to use, when, by lowering it again to place and turning it around to its proper position, it will be ready for use again. We preferably use a three-sided shaft and corresponding socket, as shown, by means of which we are enabled to use three sizes of openings. From this description it will be understood that the corn passes through the openings upon each side of the covering-cap in the stationary upper plate into holes or chambers in the oscillating intermediate disk, by the movement of which it is carried over the discharge-opening in the lower stationary plate and delivered to the earth.

In order that the corn may not be crushed by the edges of the holes or measuring-chamber of the intermediate disk, the cut-off, before referred to, is employed, which will now be described. $n$ represents a block rigidly secured to the shaft $n^1$, resting in recesses in the cap K, as shown. $n^2$ represents a rubber ball, which rests partially in a suitable recess in the cap and partially in a corresponding recess in the block. The face of the block projects through the slot in the upper plate, as shown, and it is provided with the curved ends $o$ $o$ and central recess $o'$. It will be readily understood that, as the measuring-chamber moves beneath the cut-off, any surplus of corn is swept off by it, its curved end, however, permitting any projecting grains to pass beneath it without being crushed, the block turning freely on its pivot-shaft, and also yielding freely, through the elasticity of the rubber ball, to permit such movement. N represents a recessed shoe, securely attached to the lower end of the cylinder, which is made in front, of suitable form, to open the earth, and is provided in rear with sides wider at the bottom than at the top, which sides sustain and hold the earth while the seed is dropped into the furrow, and afterward permit it to fall and cover it. P represents a transverse rock-shaft, supported in suitable bearings upon the frame-work, and provided at each end with the bent arms $p$ $p$, and at some suitable points with the lever-arm $p'$, the end of which latter is located in the path of the movement of the pins $f'$ $f'$ upon the end of the wheel. $q$ $q$ represent the indicating-rods, adapted to move vertically through openings in the arms of the cylinder, and are enlarged at their lower ends to make indentations, and are connected at their upper ends to the arms $p$ of the rock-shaft P, in the manner shown, their bent ends resting in slots in the arms $p$ $p$. R represents a spiral spring, inclosing the shaft P and suitably attached to it at some point between its ends, the latter being rigidly attached at each side to the frame-work, as shown. The arrangement is such that the spring is double-acting and tends to return the shaft quickly to place when it has been revolved out of its natural position in either direction. S S represent revolving cutters, securely attached to the frame-work by means of adjustable standards, the same being located directly in front of the shoe attached to the seed-cylinder. T T represent gage-wheels, secured to the shaft of the cutter, which are adapted to support the front end of the planter, and also to gage the depth of the furrow. U represents the tongue, pivoted by means of the cross-bar to the frame-work, which is provided with a rearwardly-extending arm, $u$, having its upper face beveled, which arm is adapted to bear against the front cross-bar of the frame-work and prevent the machine from tipping too far backward. V represents a rod of any proper construction, which is supported upon the flat bar $v$ in such a manner as to be adjusted freely forward or backward.

The various parts of the machine may be constructed of any proper material, but we preferably make it of metal, with the exception of the frame-work.

The operation of our machine is as follows: The machine having beeen properly located in the field, corn having been placed in the cylinder, and the gage-wheels adjusted to regulate properly the depth of the furrows, it is ready for operation. As it is drawn across the field, motion is communicated from the main wheels, through the cogged clutch-sleeves, to the axle, and from it, through the wheel F, to the planting mechanism and the hill-indicating mechanism, the first being operated by means of the projections $f f$, which engage at each half-revolution with one side or the other of the double lever of the rock-shaft G, and give movement to the latter, which communicates motion, through the transverse bar and its connections, to the vertical shaft, which actuates the oscillating disk that measures and discharges the grain. The hill-indicating mechanism is operated by means of the pins $f' f'$, which, at each half-revolution, move the rock-shaft P, through its lever-arm $p'$, and thus give motion to the indicating-rod. These movements correspond with the movements of the planting mechanism, so that when seed is deposited the place is indicated accurately by the indentation formed by the descent of the indicating-rod. It will be observed that the indicating-rods are raised by the movements of the pins, and that their downward movements are caused by the return action of the spring, which causes the shaft to revolve a little past its natural position, to which, however, it will be quickly returned by the action of the spring in the other direction. It will thus be seen that this arrangement of the spring gives to the rod not only its downward motion, but also quickly lifts the rod after the indentation has been made, in order that it may not drag and make an indefinite mark. The indicating-rods are made adjustable in any proper manner to suit their movement to the circumstances of the case. The construction of the shoe is advantageous, because, in consequence of its being made wider at the bottom than at the top, the earth is held in such a manner that it falls and covers the deposit of seed as the shoe passes along, instead of falling to either side and leaving it exposed. As the seed-dropping mechanism is located just in front of the main wheels B, the latter are adapted to roll the earth over the seed and complete the covering of it. When the end of a row has been reached, the sleeves are thrown out of gear by the operation of the proper lever-arms, and the machine, consequently, ceases to operate; then, by moving the seat to the rear end of the machine, the operator may tip up the front end, so that it will turn very easily, the construction of the pole preventing it from tipping back too far. In starting a new row, the indentations will indicate the position of the rows already planted, so that the next rows may be made to correspond with them. To adjust the machine to plant sooner or later in its movement, the center wheel F is revolved forward or backward, as the case may be, until the proper position is reached, when the clutch-machine is thrown into gear and the machine started. In case the adjustment is not perfectly accurate, the lever may be operated to throw the planting-machine out of gear until the wheels revolve the proper distance, when it may be again put in gear, this result being accomplished without stopping the machine.

Having thus fully described our invention, what we claim as new, and desire to secure by Letters Patent, is—

1. In combination with the movable clutch-sleeves $c c$, the spring-forks $d d$ and the revolving lever E, having arms $e' e'$, as described, the lever being adapted by its revolution to draw in the springs and release the clutch-sleeves, as described.

2. In combination with the cogged bar H, operating the planting-machine, the shaft G, having pinion $g'$ and double lever $g$, and the wheel F, having projections $f$, as described.

3. The combination of the wheel F, having pins $f'$, with the rock-shaft P, spring R, and indicating-rods, as described.

4. The combination of a spiral spring, R, as described, with a rock-shaft, P, and indicating-rods $q q$, as and for the purpose set forth.

5. The cut-off described, having the block $n$, pivot-shaft $n^1$, and ball $n^2$, arranged as described, and for the purpose set forth.

6. In combination with the cut-off, constructed as described, the stationary plates $l$ K and the intermediate oscillating plate $m$, substantially as described.

This specification signed and witnessed this 7th day of August, 1873.

ABDIEL C. MARTIN.
    ROBERT FERGUSON.

Witnesses:
 L. W. ROBEY,
 SAML. J. DODDS.